(12) United States Patent
Sakamoto

(10) Patent No.: US 7,314,038 B2
(45) Date of Patent: Jan. 1, 2008

(54) IDLE AIR CONTROL DEVICE IN MULTIPLE THROTTLE BODY

(75) Inventor: Hitoshi Sakamoto, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/519,898

(22) Filed: Sep. 13, 2006

(65) Prior Publication Data

US 2007/0068487 A1    Mar. 29, 2007

(30) Foreign Application Priority Data

Sep. 28, 2005   (JP) ............................. 2005-281576

(51) Int. Cl.
*F02D 9/10*    (2006.01)
*F02M 51/00*   (2006.01)

(52) U.S. Cl. ..................... 123/336; 123/427; 123/337

(58) Field of Classification Search ................ 123/336, 123/337, 323, 361, 328, 399, 427; 60/324, 60/292, 287, 295
See application file for complete search history.

(56) References Cited

U.S. PATENT DOCUMENTS

| | | | | |
|---|---|---|---|---|
| 6,334,430 B1 * | 1/2002 | Itabashi | ..................... | 123/336 |
| 6,415,765 B1 * | 7/2002 | Akagi et al. | ................. | 123/336 |
| 6,585,547 B2 * | 7/2003 | Tsubouchi et al. | ........ | 440/88 A |
| 6,868,828 B2 * | 3/2005 | Kondo | ................... | 123/339.26 |

FOREIGN PATENT DOCUMENTS

| | | |
|---|---|---|
| JP | 11-201004 | 7/1999 |
| JP | 2002-089415 | 3/2002 |

* cited by examiner

*Primary Examiner*—Willis R. Wolfe
*Assistant Examiner*—Johnny H. Hoang
(74) *Attorney, Agent, or Firm*—Bacon & Thomas, PLLC

(57) ABSTRACT

To provide a plural openings control type idle air control device with a low cost by adding a few parts for controlling plural bypass air passages to a single openings control type idle air control device for opening and closing a single bypass air passage, a valve body 3 is formed at a lower end part of a valve body driving mechanism 1 along the operating direction X-X of the valve body driving mechanism 1, a cylindrical plunger 5 is mounted on an outer periphery of the valve body 3, plural bypass air passages 16a, 16b connected with plural intake passages are provided to be opened on a side wall of a valve body storage chamber 13, and plural openings of the bypass air passages are controlled so as to be opened and closed by the plunger 5 slidably provided in the valve body storage chamber 13.

4 Claims, 4 Drawing Sheets

IDLE AIR CONTROL DEVICE IN MULTIPLE THROTTLE BODY

BACKGROUND OF THE INVENTION

1. Field of the Invention

The present invention relates to an idle air control device, in which idle air is controlled by a valve body operated by a valve body driving mechanism, bypasses a throttle valve, and is supplied to an intake passage at the downstream side from the throttle valve through a bypass air passage. More particularly, the present invention relates to the idle air control device in a multiple throttle body, in which a plurality of throttle bodies having intake passages through the insides thereof are provided, and the idle air controlled by a single valve body is supplied toward the respective intake passages through respective bypass air passage.

2. Description of the Conventional Art

One example of an idle air control device in a throttle body is indicated in Japanese Patent Application Laid Open No. 11-201004.

According to this idle air control device, an intake passage is provided through a throttle body, a bypass air passage is formed so as to by pass a throttle valve for opening and closing the intake passage, and the downstream side of the bypass air passage is opened in the intake passage at the downstream side from the throttle valve.

Further, a valve seat is formed in the bypass air passage, and the valve seat is controlled to be opened and closed by a valve body which is provided facing the valve seat and has a taper-shaped control valve part. Further, the valve body is operated by a valve body driving mechanism such as a stepping motor or the like.

Thus, when the valve body is operated by the valve body driving mechanism, the valve body is displaced corresponding to the stroke of the valve body driving mechanism, and the control valve part controls an opening area of the valve seat. The idle air corresponding the opening of the valve seat is supplied to the intake passage at the downstream side from the throttle valve so as to carry out an idle operation of an engine. Such the device is referred to as a single opening control type idle air control device.

Further, one more example of an idle air control device in a throttle body is indicated in Japanese Patent Application Laid Open No. 2002-89415. According to this device, the device comprises a plurality of intake passages, and the respective intake passages are controlled to be opened and closed by respective throttle valves. On the other hand, a plurality of bypass air passages, which communicate with the intake passages at the downstream side from the respective throttle valves, are opened on a side wall of a cylindrical valve body storage chamber. Such the openings are movably provided in the valve body storage chamber, and the opening is controlled to be opened and closed by an outside wall of a cylindrical single plunger operated by a valve body driving mechanism. Then, idle air corresponding to the opening is supplied to the intake passages at the downstream side from the throttle valves of the respective intake passages through the respective bypass air passages, so as to carry out an idle operation of an engine. Such the device is referred to as a plural openings control type idle air control device.

SUMMARY OF THE INVENTION

In such the conventional idle air control devices, the single opening control type idle air control device (hereinafter, referred to as the single opening type) cannot be used for the plural opening control type idle air control device (hereinafter, referred to as the plural opening type).

The reason of this is as follows. The valve seat of the single opening type is provided to be concentric with and to face the operating direction of the valve body driving mechanism and, the control valve part provided at a top end of the valve body is provided facing the valve seat. On the other hand, in the plural opening type, plural bypass air passages are provided to be opened on the side wall of the valve body storage chamber (that is, the direction rectangular to the operating direction of the valve body driving mechanism), and the opening is controlled to be opened and closed by the outside wall of the plunger movably provided in the valve body storage chamber. That is, positions of the openings (the valve seat in the single opening type and the bypass air passage in the plural opening type), which are controlled to be opened and closed by the valve bodies, are different each other. Accordingly, when the opening of the single bypass air passage is controlled, it is necessary to prepare the single opening control type idle air control device, and when the openings of plural bypass air passages are controlled, it is necessary to prepare the plural opening control type idle air control device. Thus, the idle air control device cannot be used commonly, so that a production cost cannot be reduced.

The air control device in the multiple throttle body according to the present invention solves the above-described problems, and an objective of the present invention is to provide a plural opening control type idle air control device obtained by using a single opening control type idle air control device as it is and adding a slight structure thereto. This idle air control device involves a low cost since parts can be commonly used and the number of products can be increased.

In order to achieve the above-described objective, an idle air control device in a multiple throttle body according to a first aspect of present invention is made as follows. In the idle air control device in the multiple throttle body, in which plural throttle bodies having intake passages through the insides thereof are provided, and idle air controlled by a valve body operated by a valve body driving mechanism is supplied to the intake passages at the downstream side from throttle valves provided at the respective intake passages, and the idle air is supplied through bypass air passages bypassing a throttle valve, a cylindrical plunger is mounted on an outer periphery of the valve body formed at a lower end part in the operating direction of the valve body driving mechanism, and plural bypass air passages opened on a side wall of a valve body storage chamber are controlled to be opened and closed by the plunger.

Further, according to a second aspect of the present invention, in addition to the above-described first aspect, the valve body comprises a shaft part connected with the valve body driving mechanism; a flange part having a larger diameter than that of the shaft part and a having first locking step part facing upwardly; and a second locking step part which extends from the flange part toward a control valve part and faces downwardly, and a cylindrical collar provided at least on an outer periphery of the shaft part has a segmental circular shape and comprises a third locking step part which faces the first locking step part of the flange part and is formed in the inner side thereof and a fourth locking step part which faces upwardly and is formed outside the cylindrical collar. The plunger is provided with an upward opening extending upwardly from a valve body inserting hole provided at a bottom part and a downward opening extending downwardly from the valve body inserting hole.

The upward opening is provided with a fifth locking step part formed at an upper end thereof and a sixth locking step part formed at a lower end thereof, where the fifth locking step part is recessed and faces the fourth locking step part of the collar, and the sixth locking step part is formed facing the second locking step part of the valve body. The collar is provided on outer peripheries of the shaft part and the flange part, and an annular elastic ring is provided between the third locking step part of the collar and the first locking step part of the flange part. On the other hand, the upward opening and the valve body inserting hole of the plunger are upwardly inserted through the control valve part and the collar is elastically deformed inwardly. The fifth locking step part of the plunger is locked with the fourth locking step part of the collar, and the sixth locking step part of the plunger is locked with the second locking step part of the valve body.

Further, according to a third aspect of the present invention, in addition to the second aspect, the collar is formed with a synthetic resin material, and a first hole and a second hole are continuously provided therein, where the first hole faces an outer periphery of the shaft part, and the second hole downwardly extends from a lower end of the first hole through the third locking step part extending outwardly. The collar has the fourth locking step part facing upwardly on the outside thereof. The collar is divided at a centerline into two semi-circular shaped collars with a space S between them.

Furthermore, according to a fourth aspect of the present invention, in addition to the second aspect, the plunger is formed with a brass material.

According to the first aspect of the present invention, the opening of the single bypass air passage can be controlled so as to be opened and closed by the valve body formed at the lower end part of the valve body driving mechanism, where the opening is formed in the operating direction of the valve body driving mechanism. So, the single opening control type idle air control device can be provided.

Further, since the cylindrical plunger is mounted on the outer periphery of the valve body, the openings of plural bypass air passages can be controlled so as to be opened and closed, where the openings are opened on the side wall of the cylindrical valve body storage chamber in a direction rectangular to the operating direction of the valve body driving mechanism. So, a plural opening control type idle air control device can be provided.

Accordingly, when the plunger is added to the basic single opening control type idle air control device, the device can be used as the plural opening control type idle air control device. Thus, the single opening control type idle air control device, which is commonly used in both of the single opening type and the plural opening type, can be produced in larger quantity, so that the idle air control device can be provided at a lower cost by the increasing effect of the products.

Further, according to the second aspect of the present invention, the plunger can be certainly mounted on the valve body with a remarkably easy constitution.

That is, the segmental circular cylindrical collars are mounted on the outer peripheries of the shaft part and the flange part of the valve body, and the annular elastic ring is provided between the third locking step part of the collar and the first locking step part of the flange part.

While keeping this state, the upward opening and the valve body inserting hole of the plunger are upwardly inserted toward the valve body. At this time, the collar is elastically deformed inwardly against elastic force of the annular elastic ring, and thereby, the fifth locking step part of the plunger is locked with the fourth locking step part of the collar, and the sixth locking step part of the plunger is locked with the second locking step part of the valve body.

Accordingly, the plunger is certainly supported to the valve body in the operating direction of the valve body driving mechanism through the collar. On the other hand, the plunger is certainly centered and supported with respect to the center of the valve body through the annular elastic ring and the collar.

Further, since the collar is elastically deformed inwardly against the elastic force of the annular elastic ring, locking of the fourth locking step part of the collar and the fifth locking step part of the plunger can be canceled so that the plunger can be removed from the valve body. Thus, specification change and maintenance of the plunger can be remarkably easily carried out.

Further, according to the third aspect of the present invention, the collar has the first hole, the third locking step part and the second hole which are continuously provided therein, and has the annular shape with the fourth locking step part being formed on the outside thereof. Further, the collar is divided at a centerline with a space and formed as two divided semi-circular collars.

Accordingly, since opening parts of the two semi-circular collars are respectively provided facing the shaft part and the flange part, the collars can be provided on the outer peripheries of the shaft part and the flange part without resistance. Thus, the collars can be remarkably easily mounted in a short time. Further, end surfaces on the center side of the respective semi-circular collars are formed apart from the centerline by a distance corresponding to a half of the space. Thus, when the collars are mounted on the outer periphery of the shaft part, the collar can be deformed inwardly corresponding to the width of a half of the space. So, mounting ability of the plunger to the collar can be remarkably enhanced.

Further, when the collar is formed with the synthetic resin material, the collar can be easily deformed inwardly, and the collar can be produced by injection molding. Thus, a material cost can be reduced, and the collar can be produced at a low cost and can be made into a light weight.

Furthermore, according to the fourth aspect, since the plunger is formed with a brass material, machining by an automatic lathe can be carried out, and a plating treatment for increasing rust resistance is not necessary. So, the production cost of the plunger can be reduced.

DETAILED DESCRIPTION OF PREFERRED EMBODIMENT

Figure 1:
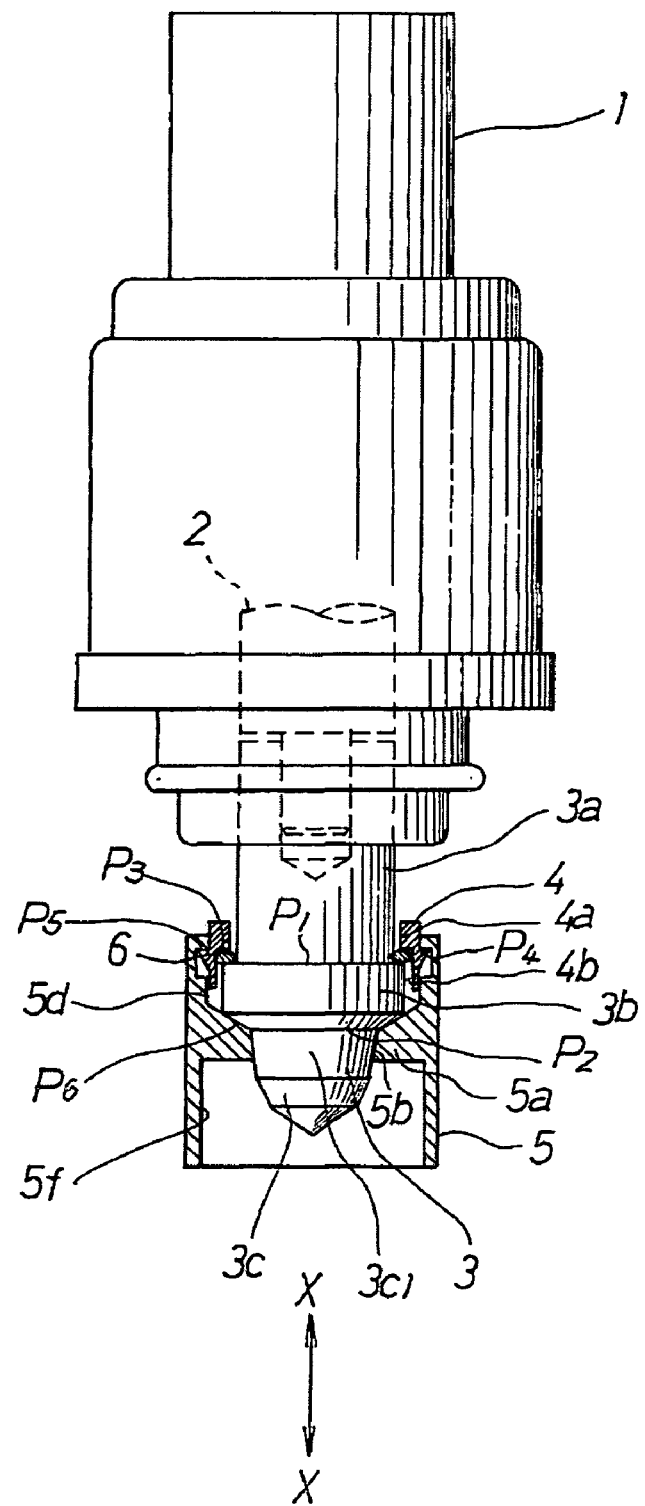
FIG. 1 is a longitudinal sectional view of main parts illustrating one embodiment of an idle air control device in a multiple throttle body according to the present invention.

Hereinafter, one embodiment of an idle air control device in a multiple throttle body according to the present invention is described with FIG. 1.

Reference numeral 1 is a valve body driving mechanism, such as a stepping motor, a wax element or the like. The stepping motor is for rotating a screw shaft by a control signal supplied electrically, and converting the rotation of the screw shaft to the operation in the axial direction of an output shaft 2 to output. The wax element is for converting and outputting as the operation of the output shaft 2 in the direction X-X in the axial direction, corresponding to the volume change of a thermal expansion material closely sealed in the inside of a case by the temperature change, where the thermal expansion material is a wax, olefin or the like. In addition, the operating direction X-X of the output shaft 2 is the operating direction of the valve body driving mechanism 1.

Reference numeral 3 is a valve body, and an upper end of a shaft part 3a is integrally mounted on a lower end of the output shaft 2 by a mounting means such as a screw or the like, so as to be synchronously moved with the output shaft 2 in the operating direction X-X of the valve body driving mechanism 1.

A flange part 3b having a larger diameter than that of the shaft part 3a is formed at a lower end of the shaft part 3a, and thereby, a first locking step part P1 upwardly facing in the drawings is formed at an upper end of the flange part 3b.

Further, a control valve part 3c is formed at a lower position than the flange part 3b, and is for controlling to open and close a valve seat hole opened in the operating direction X-X of the valve body driving mechanism 1. A second locking step part P2, which is connected to the control valve part and downwardly faces, is formed at a lower end of the flange part 3b.

The shaft part 3a, the flange part 3b and the control valve part 3c in the valve body are concentrically formed in the operating direction X-X of the valve body driving mechanism 1.

In addition, the control valve part has a taper shape, but a top end face of the control valve part may have a flat shape. The single opening control type idle air control device is formed with the valve body 3 and the valve body driving mechanism 1. The control valve part 3c of the single opening control type idle air control device is for controlling opening and closing of a single valve seat hole provided at the bypass air passage opened in the operating direction X-X of the valve body driving mechanism 1. Thus, the idle air controlled by the control valve part 3c is supplied to the intake passage at the downstream side from the throttle valve through the bypass air passage. (In the above description, the bypass air passage, the valve seat hole and the like are not illustrated in the drawings.)

Further, the plural opening control type idle air control device is formed by adding constitutions of the collar and the plunger to the single opening control type idle air control device.

Figure 2:
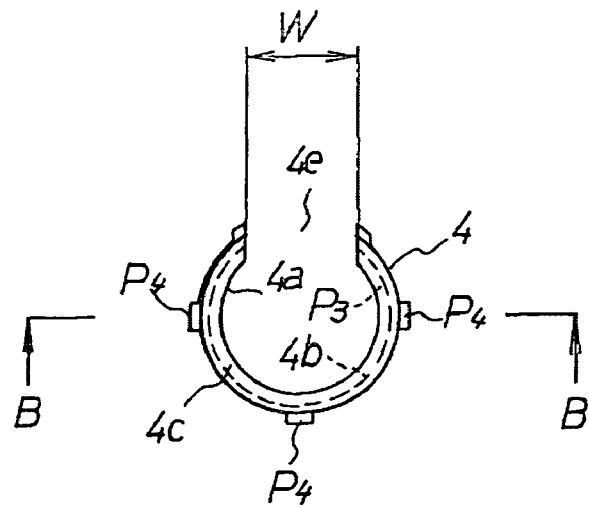
FIG. 2 is a plan view of an upper part of a collar used in FIG. 1.
Figure 3:
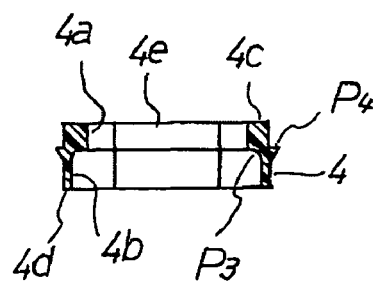
FIG. 3 is a longitudinal sectional view taken along a line B-B of FIG. 2.

One example of a collar 4 is illustrated in FIGS. 2 and 3.

The collar 4 is formed with the synthetic resin material to have a cylindrical shape, and a first hole 4a having slightly larger diameter than an outer diameter of the shaft part 3a is formed in the collar 4, and opened toward an upper end 4c at an upper part. Further, a second hole 4b (having a slightly larger diameter than that of the flange part 3b) is formed so as to extend from a lower end of the first hole 4a toward a lower end 4d at a lower part through a third locking step part P3 facing downwardly, while expanding sideward.

Further, a fourth locking step part P4 facing upwardly is formed at an outside of the collar 4.

Further, a groove 4e is provided from the upper end 4c toward the lower end 4d of the collar 4, and reaches the inside of the first hole 4a and the second hole 4b. Thus, the cylindrical collar 4 is formed to have the segmental circular shape by the groove 4e. It is preferable that a width W of the groove 4e has a smaller diameter than the diameter of the shaft part 3a.

Figure 4:
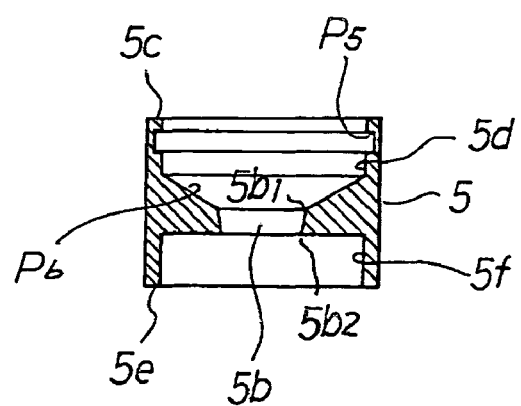
FIG. 4 is a longitudinal sectional view of a plunger used in FIG. 1.

Then, a plunger 5 is described with FIG. 4.

The plunger 5 is formed to have a cylindrical shape with the brass material.

The plunger 5 has a bottom part 5a formed at an approximately middle part thereof, and the bottom part 5a has a valve body inserting hole 5b provided through therein for inserting the control valve part 3c formed at a lower part of the valve body 3. Further, an upward opening 5d is provided from an upper end 5b1 of the valve body inserting hole 5b toward an upper end 5c of the plunger 5, and a downward opening 5f is provided from a lower end 5b2 of the valve body inserting hole 5b toward a lower end 5e of the plunger 5. That is, the upward opening 5d, the valve body inserting hole 5b and the downward opening 5f are continuously provided from the upper end 5c to the lower end 5e of the plunger 5.

It is preferable that a hole shape of the valve body inserting hole conforms to an outer shape of the control valve part 3c. In this embodiment, the hole is formed to be a taper hole having downwardly reduced diameter.

Further, the upward opening 5d is formed to have a larger diameter than the diameter of the flange part 3b of the valve body 3. A fifth locking step part P5 locked with the fourth locking step part P4 of the collar 4 is recessed and provided at the upward opening 5d near the upper end 5c. Further, a sixth locking step part P6 locked with the second locking step part P2 of the valve body 3 is formed under the upward opening 5d. That is, the upward opening 5d is provided with the recessed fifth locking step part P5 near the upper end 5c, and the sixth locking step part P6 is continuously provided with the upper end 5b1 of the valve body inserting hole 5b.

The plunger 5 is mounted on the valve body 3 through the collar 4. This state is described with FIG. 1 again. An annular elastic ring 6 are provided on the first locking step part P1 of the valve body 3, where the annular elastic ring 6 includes an O-ring, a square ring or the like which is formed with a rubber material or the like.

Then, the collar 4 is inserted and provided toward the outer peripheries of the shaft part 3a and the flange part 3b from the side direction. At this time, the groove 4e is expanded and elastically deformed so that the collar 4 is inserted.

By inserting the collar 4, the first hole 4a of the collar 4 is provided on the outer periphery of the shaft 3a while having a space, and the second hole 4b is provided on the outer periphery of the flange part 3b while having a space. Further, the third locking step part P3 of the collar 4 is provided facing the first locking step part P1 of the valve body 3, and the annular elastic ring 6 is provided between the third locking step part P3 and the first locking step part P1.

Accordingly, the collar 4 is mounted on the outer peripheries of the shaft part 3a and the flange part 3b.

Then, the plunger 5 is mounted toward the valve body 3 and the collar 4 mounted on the valve body 3.

That is, the upward opening 5*d* of the plunger 5 is inserted from the lower direction to the upper direction of the valve body 3. Thereby, the upward opening 5*d* of the plunger 5 contacts with the outer shape part of the collar 4 so as to elastically deform the fourth locking step part P4 inwardly to be reduced in diameter of it. Then, the fifth locking step part P3 passes the fourth locking step part P4 of the collar 4, and the fourth locking step part P4 is returned to an original position by own elastic force. Thereby, the fifth locking step part P5 of the plunger 5 is locked with the fourth locking step part P4 of the collar 4.

Further, the sixth locking step part P6 of the plunger 5 is locked by contacting with the second locking step part P2 of the valve body 3. Further, the valve body inserting hole 5*b* is arranged to contact with the upperpart 3*c*1 of the control valve part 3*c*. (The upper part 3*c*1 of the control valve part 3*c* does not have a function for directly opening and closing the valve seat.)

Accordingly, the sixth locking step part P6 of the plunger 5 is locked with the second locking step part P2 of the valve body 3, and the fifth locking step part P5 of the plunger 5 is locked with the fourth locking step part P4 of the collar 4. Further, the third locking step part P3 of the collar 4 is locked with the first locking step part P1 of the valve body 3 through the annular elastic ring 6. Thereby, the plunger 5 is integrally mounted on the valve body 3 in the operating direction X-X of the valve body driving mechanism 1.

At this time, the annular elastic ring 6 is provided between the third locking step part P3 of the collar 4 and the first locking step part P1 of he valve body 3, so that the plunger 5 is certainly mounted on the valve body 3 in the operating direction X-X without any backlash.

Further, the plunger 5 can be certainly centered and provided at the valve body 3 without any backlash, by the valve body inserting hole 5*b* being in contact with the upper part 3*c*1 of the control valve part 3*c* of the valve body 3, and by the upward opening 5*d* being supported to the shaft part 3*a* through the outer periphery of the collar 4 and the annular elastic ring 6.

Accordingly, the plunger 5 is mounted on the valve body 3, and thereby, the single opening control type idle air control device can be converted to the plural opening control type idle air control device.

Thus, openings of plural bypass air passages can be controlled by such the plural opening control type idle air control device.

Figure 5:
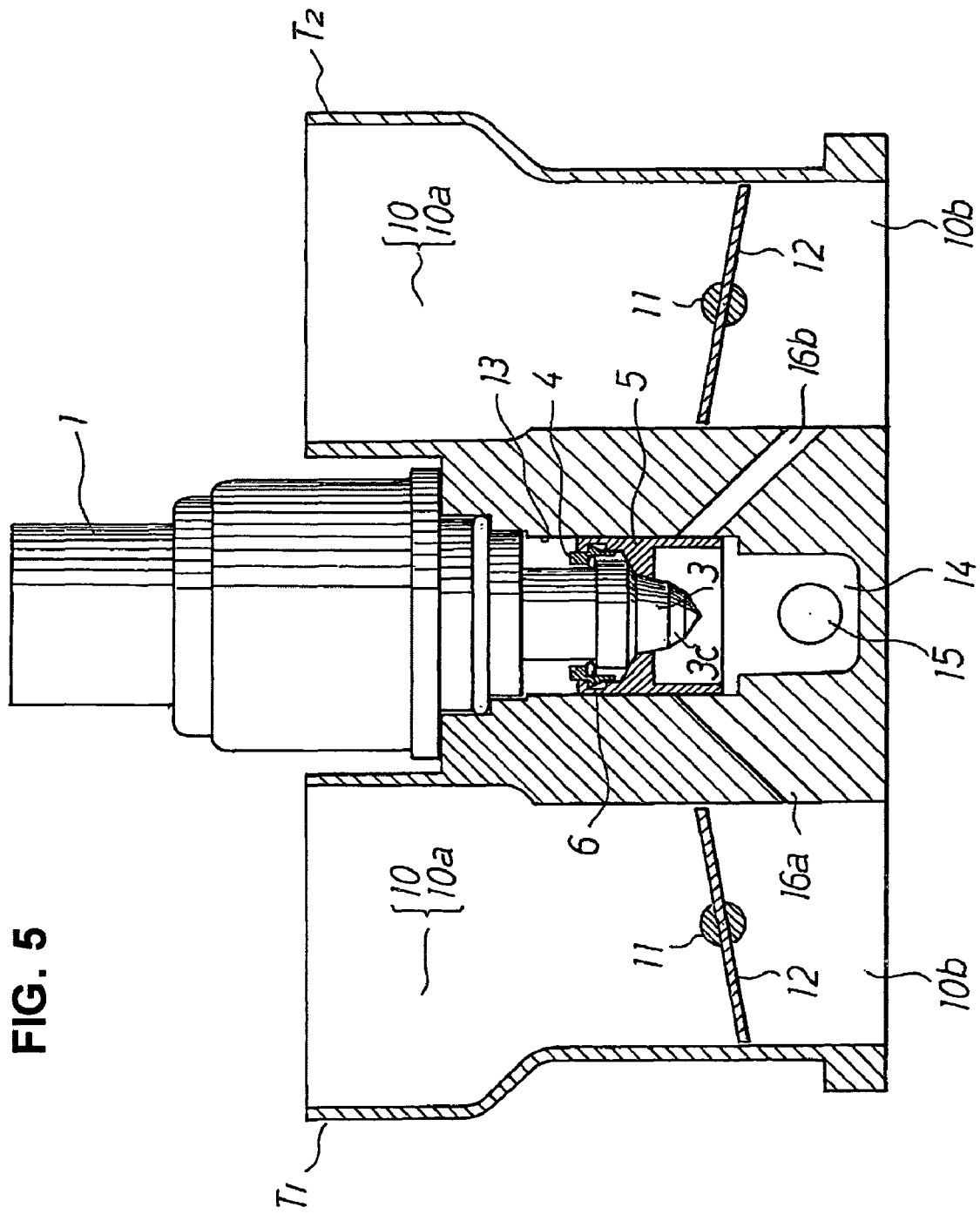
FIG. 5 is a longitudinal sectional view of main parts illustrating a state in which an idle air control device according to the present invention is attached to a multiple throttle body.

This state is described concretely in FIG. 5. A first throttle body T1 has an intake passage 10 provided through in the vertical direction. The intake passage is opened and closed by a throttle valve 12 mounted on a throttle valve shaft 11.

Further, a second throttle body T2 has an intake passage 10 provided through in the vertical direction. The intake passage is opened and closed by a throttle valve 12 mounted on the throttle valve shaft 11.

Further, the first and second throttle bodies T1, T2 are provided adjoining each other sideward, and the both throttle valves 12, 12 are synchronously opened and closed by an operator.

A cylindrical valve body storage chamber 13 is formed between the first and second throttle bodies T1, T2 which adjoin each other. The plural opening control type idle air control device is provided from the upper opening of the valve body storage chamber 13. That is, the plunger 5 mounted on the outer periphery of the valve body 3 is slidably provided in the valve body storage chamber 13.

On the other hand, a bypass air chamber 14 is opened at and connected with a lower bottom part of the valve body storage chamber 13, and an air flowing passage 15 is opened in the bypass air chamber 14, and connected with intake passages 10*a* at the upstream side from the throttle valves 12.

Further, a first bypass air passage 16*a* and a second bypass air passage 16*b* are opened on a side wall of the valve body storage chamber 13. The downstream of the first bypass air passage 16*a* is opened in an intake passage 10*b* at the downstream side from the throttle valve 12 of the first throttle body T1. The downstream of the second bypass air passage 16*b* is opened in the intake passage 10*b* at the downstream side from the throttle valve 12 of the second throttle body T2.

Accordingly, when the output shaft 2 of the valve body driving mechanism 1 is operated, the valve body 3 in the valve body storage chamber 13 is moved synchronously with the operation of the output shaft 2 along the operating direction X-X. Then, the openings of first and second bypass air passages 16*a*, 16*b* opened in the valve body storage chamber 13 are controlled by the outer periphery of the plunger 5. Thereby, the amount of air in the bypass air chamber 14 is controlled by the openings, and the idle air corresponding to the openings is supplied the intake passage 10*b* at the downstream side from the throttle valve 12 of the first throttle body T1 through the first bypass air passage 16*a*. Simultaneously, the idle air corresponding to the openings is supplied to the intake passage 10*b* at the downstream side from the throttle valve 12 of the second throttle body T2 through the second bypass air passage 16*b*. Thus, a most suitable idling operation of an engine can be carried out.

As described above, according to the idle air control device of the present invention, the cylindrical plunger 5 is mounted on the outer periphery of the valve body 3 formed at the lower end part of the single opening control type idle air control device, so as to obtain the plural opening control type idle air control device used in a multiple throttle body. The single opening control type idle air control device can be used as it is in the single opening control type and plural openings control type idle air control devices. Thereby, the idle air control device can be provided having at a low cost due to the effect of increased production volume.

Further, when the plunger 5 is mounted on the valve body 3, the cylindrical collar 4 having the segmental circular shape and the annular elastic ring 6 are prepared.

Further, the collar 4 is provided on the outer peripheries of the shaft part 3*a* and the flange part 3*b* by expanding the groove 4*e* having a segmental part, and the annular elastic ring 6 is provided between the third locking step part P3 of the collar 4 and the first locking step part P1 of the flange part 3*b*.

Further, the upward opening 5*d* and the valve body inserting hole 5*b* of the plunger 5 are inserted upwardly through the control valve part 3*c* of the valve body 3, and the collar 4 is elastically deformed inwardly. Thereby, the fifth locking step part P5 of the plunger 5 is locked with the fourth locking step part of the collar 4, and the sixth locking step part P6 of the plunger 5 is locked with the second locking step part P2 of the valve body 3.

Accordingly, the sixth locking step part P6 of the plunger 5 is locked with the second locking step part P2 of the valve body 3, and the fifth locking step part P5 of the plunger 5 is locked with the fourth locking step part P4 of the collar 4, the third locking step part P3, the annular elastic ring 6, and the first locking step part P1 of the valve body 3. Thus, the plunger 5 can be certainly mounted on the valve body 3 in the operating direction X-X of the valve body driving mechanism 1.

Further, at this time, since the annular elastic ring 6 is provided between the third locking step part P3 of the collar and the first locking step part P1 of the valve body 3, the backlash between the plunger 5 and the valve body 3 in the operating direction X-X can be prevented.

Further, the valve body inserting hole 5b of the plunger 5 is provided in contact with the upper part 3c1 of the control valve part 3c of the valve body 3, and the upward opening 5d of the plunger 5 is provided in contact with the outer periphery of the collar 4. Further, the annular elastic ring 6 is provided between the collar 4 and the shaft part 3a. Thus, the plunger 5 can be certainly centered and provided at the valve body 3 without any backlash.

Furthermore, as for the plunger 5, the collar 4 is elastically deformed inwardly, so as to cancel locking of the fourth locking step part P4 of the collar 4 with the fifth locking step part P5 of the plunger 5, so that the plunger 5 can be removed from the valve body 3.

Figure 6:
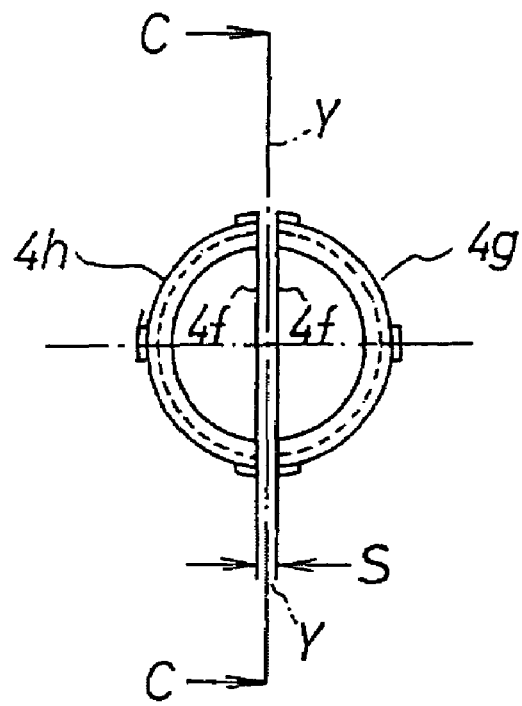
FIG. 6 is a plan view of an upper part illustrating the other embodiment of a collar used in an idle air control device according to the present invention.
Figure 7:
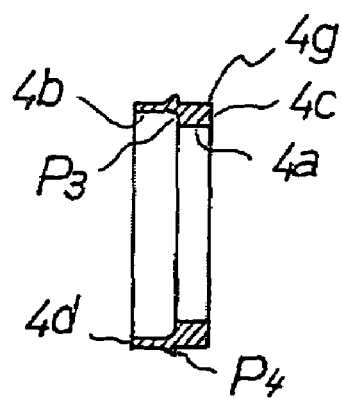
FIG. 7 is a side view taken along a line C-C in FIG. 6.

Then, the other embodiment of the collar is described with FIGS. 6 and 7.

In this embodiment, the groove 4e of the collar 4 illustrated in FIGS. 2 and 3 is not formed, and an annular collar is formed. Then, the collar is divided into two at the centerline Y-Y with a space S between them, so as to make two semi-circular collars 4g, 4h having a segmental end faces 4f. In addition, the two collars 4g, 4h can be formed by injection molding without dividing an annular collar, and used in facing each other.

The two collars 4g, 4h are provided toward the shaft part 3a and the flange part 3b of the valve body 3 from the side direction, and the third locking step part P3 is provided in contact with the annular elastic ring 6 provided on the first locking step P1 of the flange part 3b.

Further, the upward opening 5d of the plunger 5 is upwardly inserted and provided toward the outer peripheries of the collars 4g, 4h. At this time, the collars 4g, 4h are wholly moved inwardly by a distance corresponding to a half of the space S, and then, are returned to the original positions. So, each the fourth locking step part P4 of the collars 4g, 4h is locked with the fifth locking step part 5P of the plunger 5.

Accordingly, since the collars 4g, 4h are provided from the side direction toward the shaft part 3a and the flange part 3b, mounting work of the collars 4g, 4h to the valve body 3 can be easily carried out. Further, since the collars 4g, 4h can be wholly moved inwardly, mountability of the plunger 5 can be enhanced.

Further, the plunger 5 is formed with the brass material. So, the plunger 5 can be machined with high accuracy by an automatic lathe, and a plating treatment is not necessary.

The idle air control device of the present invention can be used as a starting mixture air control device of a bi-starter device, which is for supplying starting mixture air to an intake passage at the downstream side from a throttle valve in a carburetor.

What is claimed is:

1. An idle air control device in a multiple throttle body, in which plural throttle bodies having intake passages through the inside thereof are provided, and idle air controlled by a valve body operated by a valve body driving mechanism is supplied to the intake passages at the downstream side from throttle valves provided at the respective intake passages, and the idle air is supplied through bypass air passages bypassing a throttle valve, wherein a cylindrical plunger is mounted on an outer periphery of a valve body formed at a lower end part in the operating direction of a valve body driving mechanism, and plural bypass air passages opened on a side wall of a valve body storage chamber are controlled so as to be opened and closed by the plunger.

2. The idle air control device in a multiple throttle body as claimed in claim 1, wherein the valve body comprises a shaft part connected with the valve body driving mechanism; a flange part having a larger diameter than that of the shaft part and having a first locking step part facing upwardly; and a second locking step part which extends from the flange part toward a control valve part and faces downwardly, wherein a cylindrical collar provided at least on an outer periphery of the shaft part has a segmental circular shape, and comprises a third locking step part which is formed in the inner side thereof and faces the first locking step part of the flange part; and a fourth locking step part which is formed in the outer side thereof and faces upwardly, wherein the plunger is provided with an upward opening extending upwardly from a valve body inserting hole provided at a bottom part and a downward opening extending downwardly from the valve body inserting hole, wherein the upward opening is provided with a fifth locking step part formed at an upper end thereof; and a sixth locking step part formed at a lower end thereof, where the fifth locking step part is recessed and faces the fourth locking step part of the collar, and the sixth locking step part is formed facing the second locking step part of the valve body, wherein the collar is provided on outer peripheries of the shaft part and the flange part, and an annular elastic ring is provided between the third locking step part of the collar and the first locking step part of the flange part, wherein, on the other hand, the upward opening and the valve body inserting hole of the plunger are upwardly inserted through the control valve part, and the collar is elastically deformed inwardly, and wherein the fifth locking step part of the plunger is locked with the fourth locking step part of the collar, and the sixth locking step part of the plunger is locked with the second locking step part of the valve body.

3. The idle air control device in a multiple throttle body as claimed in claim 2, wherein the collar is formed with a synthetic resin material, and a first hole and a second hole are continuously provided therein, where the first hole faces an outer periphery of the shaft part, and the second hole downwardly extends from a lower end of the first hole through the third locking step part extending outwardly, wherein the collar has the fourth locking step part facing upwardly on the outer side thereof, and wherein the collar is divided at a centerline into two semi-circular shaped collars with a space between them.

4. The idle air control device in a multiple throttle body as claimed in claim 2, wherein the plunger is formed with a brass material.

* * * * *